US006823971B2

(12) United States Patent
Takeda et al.

(10) Patent No.: US 6,823,971 B2
(45) Date of Patent: Nov. 30, 2004

(54) SIMPLIFIED LOADING DEVICE

(75) Inventors: Hiroshi Takeda, Kashiwa (JP); Makoto Saito, Kashiwa (JP); Masami Nakano, Yonezawa (JP)

(73) Assignee: Oriental Motor Co., Inc., Tokyo (JP)

( * ) Notice: Subject to any disclaimer, the term of this patent is extended or adjusted under 35 U.S.C. 154(b) by 0 days.

(21) Appl. No.: 10/101,043

(22) Filed: Mar. 19, 2002

(65) Prior Publication Data

US 2003/0178260 A1 Sep. 25, 2003

(51) Int. Cl.[7] ............................................. F16D 63/00
(52) U.S. Cl. ................... 188/267.2; 188/267
(58) Field of Search ....................... 188/267, 267.1, 188/267.2, 67; 142/21.5

(56) References Cited

U.S. PATENT DOCUMENTS

| 2,604,198 | A | * | 7/1952 | Stephenson | 192/21.5 |
|---|---|---|---|---|---|
| 2,650,684 | A | * | 9/1953 | English, Jr. et al. | 192/21.5 |
| 3,366,903 | A | * | 1/1968 | Searle et al. | 335/209 |
| 4,200,003 | A | * | 4/1980 | Miller | 74/574 |
| 4,239,092 | A | * | 12/1980 | Janson | 188/267 |
| 4,856,631 | A | * | 8/1989 | Okamoto et al. | 192/21.5 |
| 4,974,706 | A | * | 12/1990 | Maji et al. | 192/21.5 |
| 5,598,908 | A | * | 2/1997 | York et al. | 192/21.5 |
| 5,947,238 | A | * | 9/1999 | Jolly et al. | 188/267.2 |
| 6,412,618 | B1 | * | 7/2002 | Stretch et al. | 192/35 |
| 6,464,050 | B2 | * | 10/2002 | Smith et al. | 188/267.1 |
| 6,466,119 | B1 | * | 10/2002 | Drew | 335/306 |

FOREIGN PATENT DOCUMENTS

WO   WO 99/06731   * 2/1999

* cited by examiner

*Primary Examiner*—Douglas C. Butler
*Assistant Examiner*—Bradley King
(74) *Attorney, Agent, or Firm*—Trop, Pruner & Hu, P.C.

(57) ABSTRACT

There is provided a simplified loading device in which a permanent magnet is arranged between a moving element and a fixed element for holding the moving element, a magnetic fluid is disposed in a gap developed at some midpoint in a magnetic circuit in which the magnetic flux of the permanent magnet passes through the moving element, and a shearing force of the magnetic fluid produced by the magnetic flux of the permanent magnet is exerted on the moving element as a loading force.

Thereby, a higher loading force can be generated and the device can be made smaller in size than in the case of the conventional friction or hysteresis brake.

1 Claim, 4 Drawing Sheets

SIMPLIFIED LOADING DEVICE

FIELD OF THE INVENTION AND RELATED ART STATEMENT

The present invention relates to a simplified loading device capable of applying a fixed load to a moving element such as a motor shaft without the occurrence of friction.

As is well known, a motor braking method has been used in which a sliding brake is incorporated in a motor casing for a motor, and this brake is always applied to provide braking torque at the time of stoppage.

FIG. 6 shows a simplified braking mechanism for a reversible motor, which has been used conventionally.

A motor casing 100 for a motor contains a stator 101 and a rotor 102, and a brake disc 104 is mounted on a rotating shaft 103 of the rotor 102. On the inside face of the motor casing 100 opposed to the brake disc 104 are disposed a plurality of brake shoes 105 which are in slidable contact with the brake disc 104. The brake shoe 105 is inserted in a hole 108 formed axially in a bearing housing portion 107 on which a bearing 106 for supporting the rotating shaft 103 is mounted, and is urged toward the brake disc 104 via a coil spring 109. Reference numeral 110 denotes a spring support plate.

This braking mechanism is configured so that the brake shoes 105 are always pressed on the brake disc 104 by the urging force of the coil spring 109 to bring the brake shoes 105 into contact with the brake disc 104, and thereby a load is developed due to friction, by which braking action and holding torque at the time of stoppage are obtained.

FIG. 7 shows a braking mechanism that obtains a load using a permanent magnet.

A rotating disc 112 mounted with a hysteresis material 111 along the circumferential direction on one side face in the axial direction. On the other hand, a yoke 114 provided with a permanent magnet 113 on a face opposed to the hysteresis material 111 is mounted on a bearing 106 supporting the rotating shaft 103. The relative rotation of the permanent magnet 113 and the hysteresis material 111 around the same axis develops a load due to magnetism.

However, according to the above-described braking mechanism using friction, the loading force is changed by the time change of surface condition of a shoe material used for the brake shoe 105, and the service life is limited by the wear of shoe material.

Also, in the above-described hysteresis brake, the loading force depends on magnetic lines passing through a gap between the permanent magnet 113 and the hysteresis material 111, so that the gap must be adjusted delicately, and also the expensive hysteresis material 111 must be used.

OBJECT AND SUMMARY OF THE INVENTION

The present invention has been made to solve the above problems, and accordingly an object thereof is to provide a simplified loading device capable of generating a high and steady loading force and being made smaller in size as compared with the related art.

To achieve the above object, the present invention provides a simplified loading device in which a permanent magnet is arranged between a moving element and a fixed element for holding the moving element, a magnetic fluid is disposed in a gap developed at some midpoint in a magnetic circuit in which the magnetic flux of the permanent magnet passes through the moving element, and a shearing force of the magnetic fluid produced by the magnetic flux of the permanent magnet is exerted on the moving element as a loading force.

Also, the present invention provides a simplified loading device in which a permanent magnet is arranged between a rotating shaft and a fixed element for holding the rotating shaft, a magnetic fluid is disposed in a gap developed at some midpoint in a magnetic circuit in which the magnetic flux of the permanent magnet passes through the rotating shaft, and a shearing force of the magnetic fluid produced by the magnetic flux of the permanent magnet is exerted on the rotating shaft as a loading force.

In the present invention, the magnetic fluid is disposed on the peripheral surface of the rotating shaft or the inside surface of the fixed element.

Further, in the present invention, magnetic powder is dispersed in a solution as the magnetic fluid, a drag against shearing due to a fixed chain is created under a condition in which a fixed magnetic force is exerted, and a fixed drag is created even after shearing has been performed.

DETAILED DESCRIPTION OF PREFERRED EMBODIMENTS

Embodiments of the present invention will now be described in detail with reference to the accompanying drawings.

Figure 1:
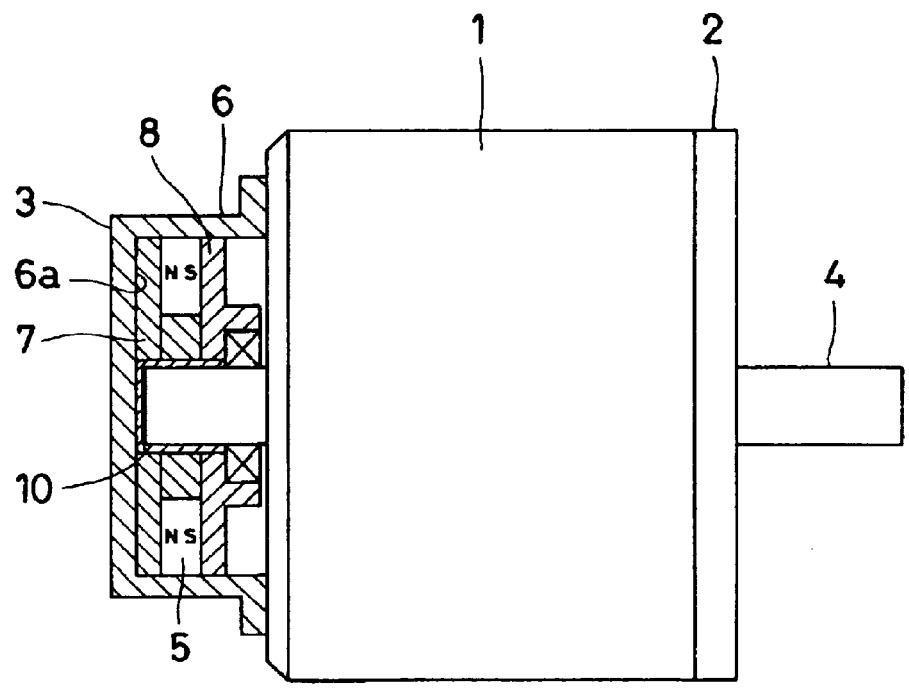
FIG. 1 is a partially sectioned side view of a simplified loading device in accordance with one embodiment of the present invention.
Figure 2:
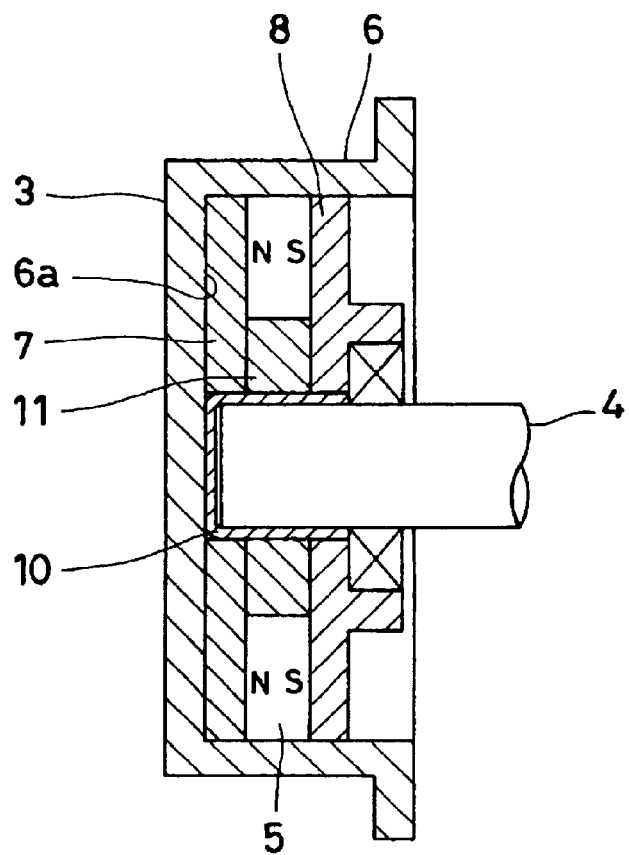
FIG. 2 is a partially enlarged sectional view of FIG. 1.

FIGS. 1 and 2 show a motor 1 to which a simplified loading device in accordance with the present invention is applied. On a motor casing 2 for the motor 1 is additionally provided a loading device 3. This loading device 3, which is assembled to the motor casing 2 so as to cover a motor shaft 4 provided protrusively from the motor casing 2, applies a load, which is developed by a magnetic force of a permanent magnet 5 incorporated in the loading device 3, to the motor shaft 4 of the motor 1.

As shown in FIG. 2, the loading device 3 is configured so that a pair of annular discs 7 and 8, which support the permanent magnet 5 by holding it therebetween and serve as magnetic poles, are incorporated in a housing 6 formed of a nonmagnetic material. These discs 7 and 8 are formed of a magnetic material such as iron, and are arranged so that the motor shaft 4 of the motor 1 is held on the axes of the discs 7 and 8. One disc 7 is arranged so that one side face thereof is in contact with an inside wall surface 6a of the housing 6, and holds one side of the permanent magnet 5 at the outer periphery on the other side. The other disc 8 holds the other side of the permanent magnet 5 at the outer periphery on the other side. The permanent magnet 5 is disposed in such a manner that the disc 7 side is the N pole and the disc 8 side is the S pole. In this case, the polarity of the permanent magnet 5 is not subject to any restriction; the N and S poles may be arranged reversely.

In the tip end portion of the motor shaft 4 of the motor 1, a magnetic fluid 10 is provided so as to close gaps between the motor shaft 4 and the inner peripheral faces of the discs 7 and 8. As the magnetic fluid 10, for example, water, oil, or silicone can be used.

This magnetic fluid 10, which is a substance produced by dispersing magnetic powder in a solution, has a property such that although it is chained by magnetism and turns to a solid form, even if a shearing force higher than the allowable value acts, the chain of fluid is merely separated, and the magnetic powder itself is not affected. By the use of the magnetic fluid 10, a drag against shearing due to a fixed chain is created under a condition in which a fixed magnetic force is exerted, and a fixed drag is created even after shearing has been performed.

Between the permanent magnet 5 and the magnetic fluid 10 on the inside diameter side of the permanent magnet 5, a nonmagnetic element 11 or a space is provided.

The following is a description of the operation of the present invention configured as described above.

The magnetic flux coming out of the permanent magnet 5 passes through the disc 7, the magnetic fluid 10, the motor shaft 4, the magnetic fluid 10, and the disc 8, and returns to the permanent magnet 5.

Thus, when the motor 1 is not started, the motor shaft 4 is kept in the direction of rotation by the shearing force of the magnetic fluid 10 created by the permanent magnet 5.

When the motor 1 is started, a rotating force is applied to the motor shaft 4. At this time, the magnetic flux coming out of the permanent magnet 5 passes through the disc 7, the magnetic fluid 10, the motor shaft 4, the magnetic fluid 10, and the disc 8, and returns to the permanent magnet 5, and thus it serves as a loading force for holding the motor shaft 4. If the shearing force of the magnetic fluid 10 is exceeded, a rotating load is generated by a force created by a coupling force of magnetic fluid, by which a load is applied to the motor shaft 4.

Since the magnetic fluid 10 is provided so as to close the gaps between the motor shaft 4 and the inner peripheral faces of the discs 7 and 8 as described above, the heat dissipation capacity is improved, so that the device can be made smaller in size.

Figure 3:
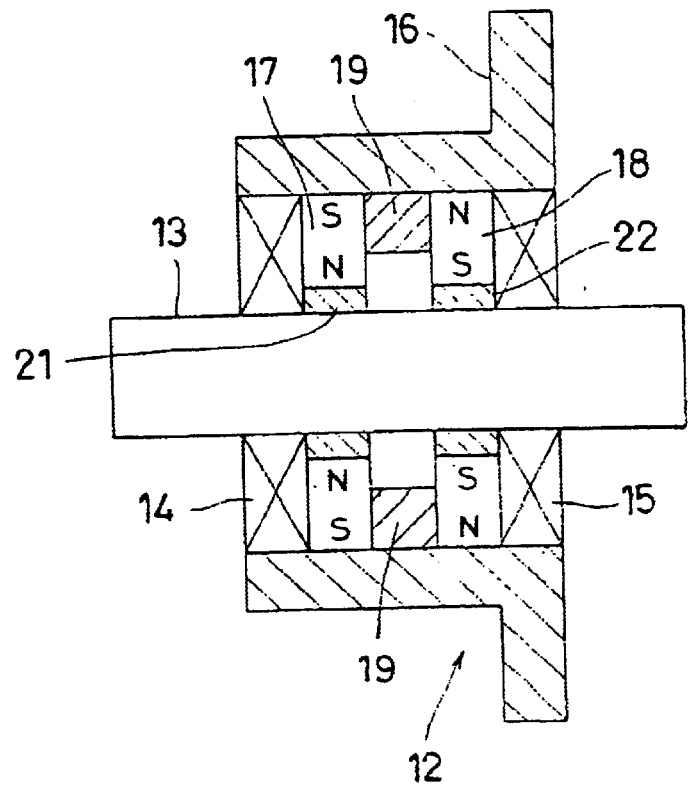
FIG. 3 is a sectional view of a simplified loading device in accordance with another embodiment of the present invention.
Figure 4:
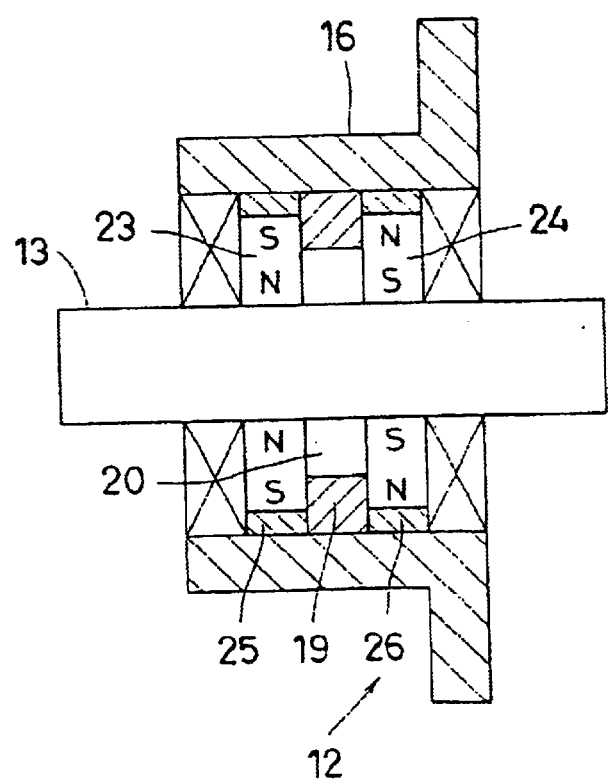
FIG. 4 is a sectional view of a simplified loading device in accordance with still another embodiment of the present invention.

FIGS. 3 and 4 show loading devices 12 of other embodiments. In the loading devices 12, the magnetic poles N and S of the permanent magnets 17 and 18 are disposed in the radial direction.

In the embodiment shown in FIG. 3, a magnetic yoke is used for a tubular case 16 for supporting a rotatable shaft 13 via bearings 14 and 15, and annular permanent magnets 17 and 18 are arranged in the case 16 so as to be opposed to each other with a predetermined interval provided therebetween. These permanent magnets 17 and 18 are configured in such a manner that one permanent magnet 17 is arranged so that the S pole is on the outer peripheral side and the N pole is on the inner peripheral side, and the other permanent magnet 18 is arranged so that the N pole is on the outer peripheral side and the S pole is on the inner peripheral side. The permanent magnets 17 and 18 are also configured so that the outer peripheral face is supported on the inner peripheral surface of the case 16, and a magnetic element 19, for example, formed of iron is interposed between the opposed faces at the outer periphery of the permanent magnets 17 and 18. A nonmagnetic element 20 or a space is provided on the inside diameter side of the magnetic element 19.

Also, the shaft 13 is inserted on the axes on the inner peripheral side of the permanent magnets 17 and 18, and magnetic fluids 21 and 22 are disposed in gaps between the shaft 13 and the permanent magnets 17 and 18, respectively.

In this embodiment, a magnetic circuit from the permanent magnet 17 to the magnetic fluid 21 to the shaft 13 to the magnetic fluid 22 to the permanent magnet 18 to the magnetic element 19 and to the permanent magnet 17 is formed, so that a load is applied to the shaft 13.

In the embodiment shown in FIG. 4, an explanation is given by applying the same reference numerals to the same elements as those in FIG. 3. In this embodiment, a pair of annular permanent magnets 23 and 24, which are arranged in the case 16, are fixed to the shaft 13, and magnetic fluids 25 and 26 are interposed in gaps between the permanent magnets 23 and 24 and the case 16 formed on the outer peripheral side of the permanent magnets 23 and 24. Other configurations are the same as those in FIG. 3, so that the explanation thereof is omitted.

In this embodiment, a magnetic circuit from the permanent magnet 24 to the magnetic fluid 26 to the case 16 to the magnetic fluid 25 to the permanent magnet 23 to the shaft 13 and to the permanent magnet 24 is formed, so that a load is applied to the shaft 13.

Although the explanation has been given by using the paired annular permanent magnets 17 and 18 and 23 and 24 in the loading device 12 shown in FIGS. 3 and 4, one of the permanent magnets 17 and 18 (23 and 24) can be replaced by a magnetic element, or a magnetic element can be arranged additionally in the axial direction to increase the number of poles.

Further, the example in which annular permanent magnets 17 and 18 (23 and 24) are used has been explained regarding the loading devices 12 shown in FIGS. 3 and 4, a plurality of permanent magnets can be arranged radially in place of each of the annular permanent magnets. In this case, the magnetic fluids 21 and 22 (25 and 26) can be arranged so that the number of magnetic fluids is increased according to the increased number of permanent magnets.

Figure 5:
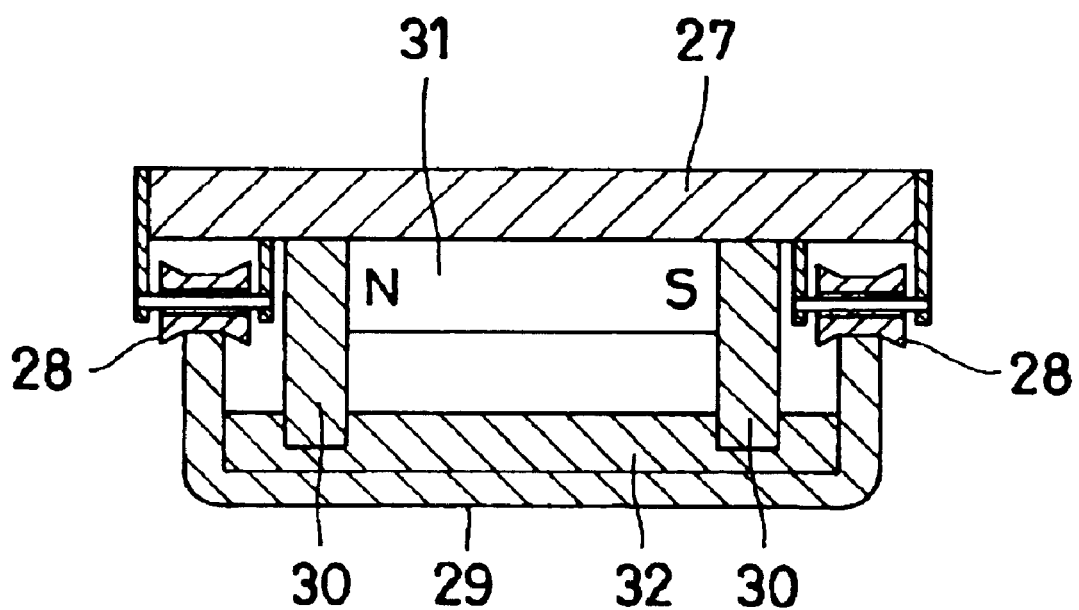
FIG. 5 is a sectional view of a simplified loading device in accordance with still another embodiment of the present invention.
Figure 6:
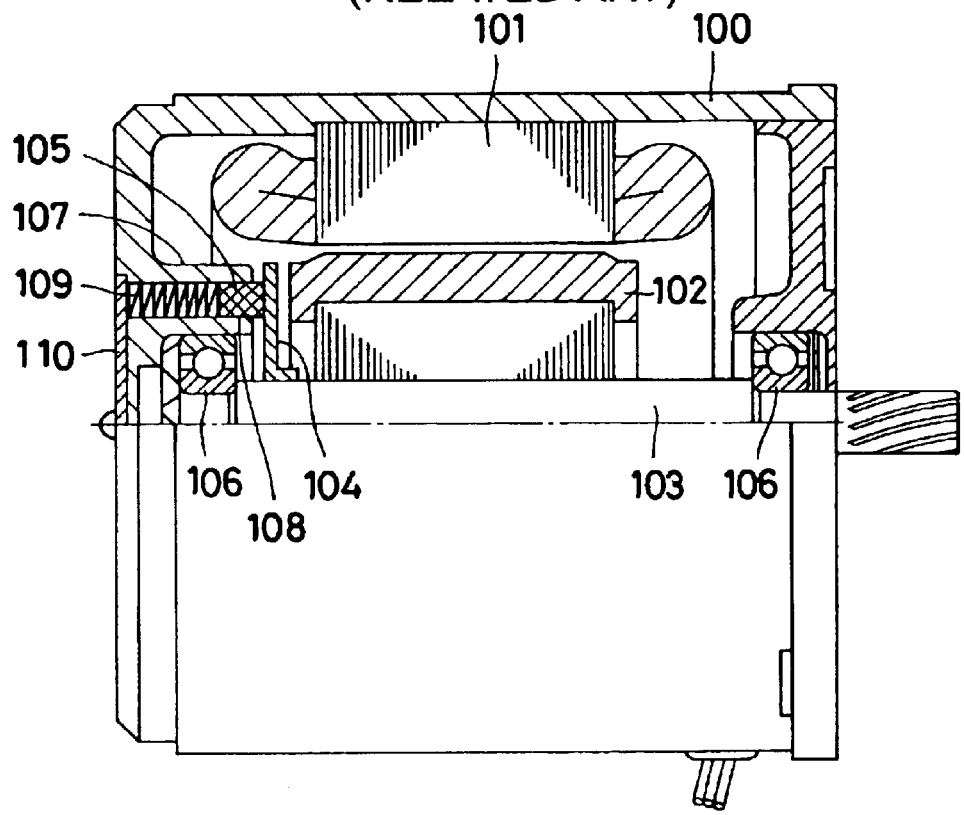
FIG. 6 is a partial sectional view of a conventional simplified loading device.
Figure 7:
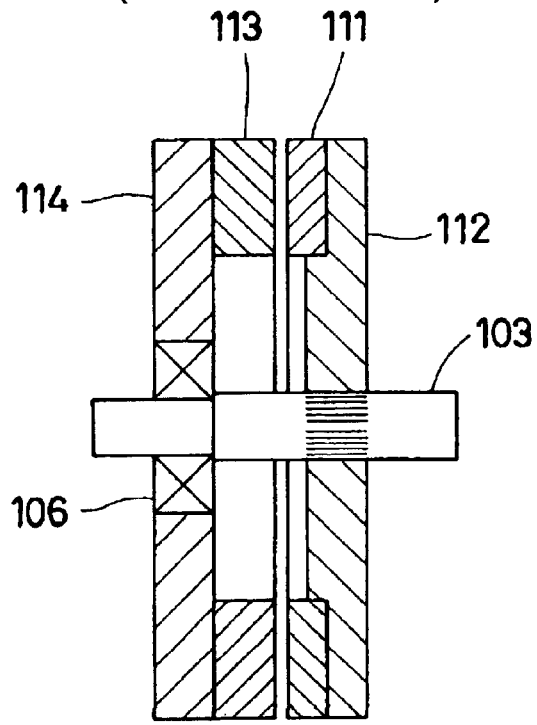
FIG. 7 is a sectional view of another conventional simplified loading device.

FIG. 5 shows an embodiment in which a loading device in accordance with the present invention is applied to a linear moving element, not a rotating moving element.

In this case, a carriage 27 is used as the moving element. This carriage 27 is formed of a nonmagnetic material. The carriage 27 moves along a guide rail 29 having a U shape in cross section, which is made of iron etc., via rollers 28 provided on both sides under the carriage 27.

Under the carriage 27, magnetic elements 30, 30 opposed to each other in the width direction are provided, and a permanent magnet 31 is disposed between the magnetic elements 30, 30. The permanent magnet 31 is disposed so that the N and S poles are arranged in the width direction.

Also, a magnetic fluid 32 is filled into the inside of the guide rail 29 to close gaps between the magnetic elements 30, 30 and the guide rail 29.

According to the above-described embodiment, the magnetic flux coming out of the permanent magnet 31 passes through the magnetic element 30, the magnetic fluid 32, a yoke, the magnetic fluid 32, and the magnetic element 30, and returns to the permanent magnet 31 to form a magnetic circuit, so that a load is applied to the carriage 27. Thus, a fixed brake can be applied always to the carriage 27 without the need for a power source.

The present invention is not limited to the above-described embodiments. For example, the shaft serving as a rotating shaft is not limited to the motor shaft, and it is a matter of course that the loading device in accordance with the present invention can be applied to a shaft rotated by another power. Also, the loading device can be applied to a linear moving element other than a rotating shaft, and further the loading device can be used together with another braking force. Also, the direction of magnetic circuit may be set as necessary, and the intensity of permanent magnet and the number of permanent magnets may be set arbitrarily. Further, it is a matter of course that as the magnetic fluid, any magnetic fluid consisting of various components can be used. In addition, needless to say, any changes and modifications can be made without departing form the spirit and scope of the present invention.

As described above, according to the simplified loading device in accordance with the present invention, the effects described below can be achieved.

In the simplified loading device, a permanent magnet is arranged between a moving element and a fixed element for holding the moving element, a magnetic fluid is disposed in a gap developed at some midpoint in a magnetic circuit in which the magnetic flux of the permanent magnet passes through the moving element, and a shearing force of the magnetic fluid produced by the magnetic flux of the permanent magnet is exerted on the moving element as a loading force. Therefore, in comparison with the conventional friction-type or hysteresis-type loading device, there is no gap so that resistance of the magnetic circuit can be reduced and the heat dissipation capacity can be improved, with the result that the device can be made smaller in size in the case where the load is equal.

Also, in the simplified loading device, a permanent magnet is arranged between a rotating shaft and a fixed element for holding the rotating shaft, a magnetic fluid is disposed in a gap developed at some midpoint in a magnetic circuit in which the magnetic flux of the permanent magnet passes through the rotating shaft, and a shearing force of the magnetic fluid produced by the magnetic flux of the permanent magnet is exerted on the rotating shaft as a loading force. Therefore, in comparison with the conventional friction-type or hysteresis-type loading device, there is no gap so that resistance of the magnetic circuit can be reduced and the heat dissipation capacity can be improved, with the result that the device can be made smaller in size in the case where the load is equal.

Since the magnetic fluid is disposed on the peripheral surface of the rotating shaft or the inside surface of the fixed element, in comparison with the conventional hysteresis-type loading device, there is no gap so that resistance of the magnetic circuit can be reduced and the heat dissipation capacity can be improved, with the result that the device can be made smaller in size in the case where the load is equal.

In the simplified loading device, magnetic powder is dispersed in a solution as the magnetic fluid, a drag against shearing due to a fixed chain is created under a condition in which a fixed magnetic force is exerted, and a fixed drag is created even after shearing has been performed. Therefore, since there is no friction portion, the service life is semi-eternal. Also, since there is no friction sliding portion, a noise is not produced.

What is claimed is:

1. A simplified loading device comprising, a rotating shaft;

a fixed element for holding said rotating shaft;

a pair of permanent magnets arranged so as to be opposed to each other on the outer peripheral face of said rotating shaft;

a magnetic fluid disposed between said pair of permanent magnets and said fixed element;

a magnetic element arranged on the inner peripheral face of said fixed element and between said magnetic fluid disposed between said pair of permanent magnets and said fixed element;

wherein a magnetic circuit from one of said permanent magnets to said magnetic fluid to said magnetic element to said magnetic fluid to the other of said permanent magnets to said rotating shaft to one of said permanent magnets is formed, so that a shearing force of said magnetic fluid produced by the magnetic flux of said permanent magnets is applied to said rotating shaft as a loading device.

* * * * *